Dec. 6, 1949     C. L. MADDEN     2,490,594
PLUG NUT
Filed July 26, 1943
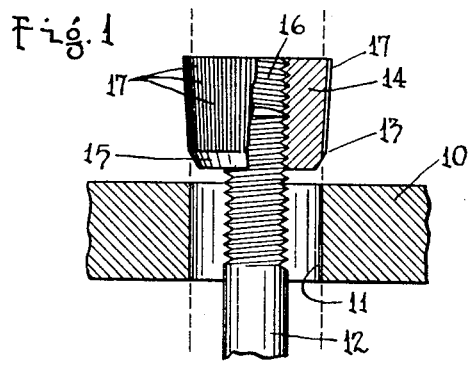
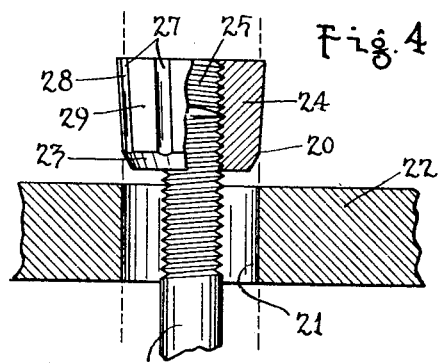
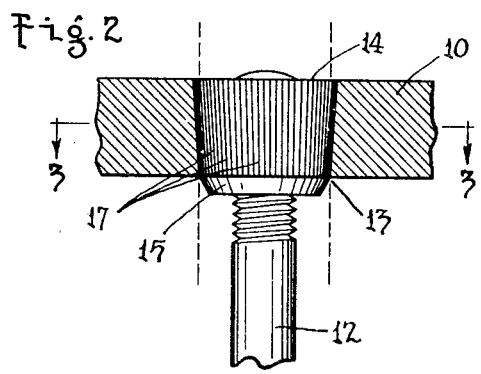
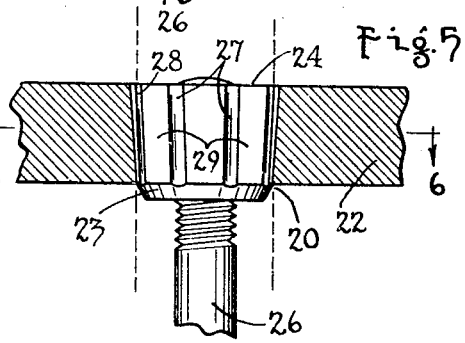
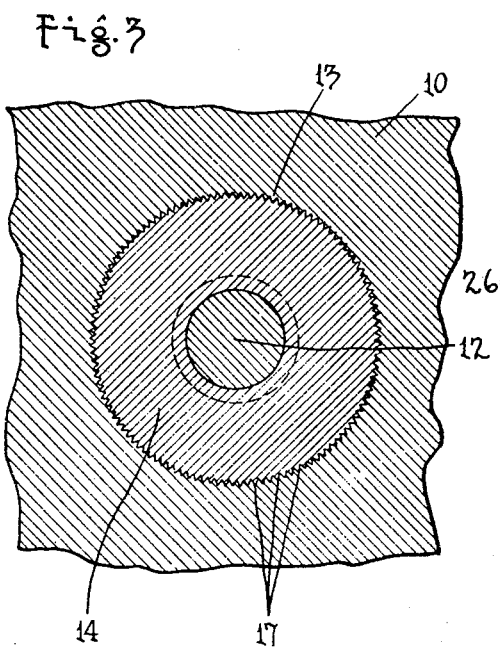
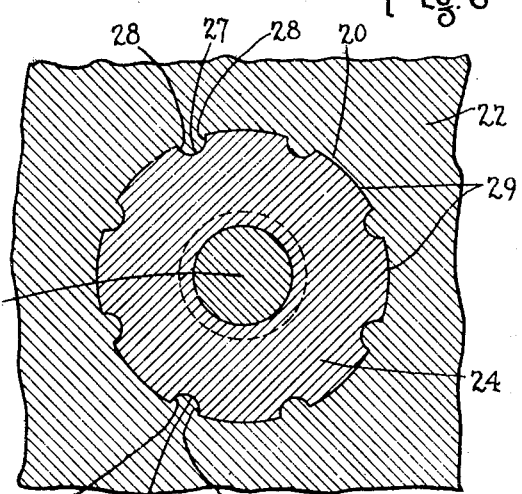
Inventor
Charles L. Madden
By Caswell + Lagaard
Attorneys Patented Dec. 6, 1949

2,490,594

UNITED STATES PATENT OFFICE 2,490,594

PLUG NUT

Charles L. Madden, Minneapolis, Minn.

Application July 26, 1943, Serial No. 496,115

4 Claims. (Cl. 85—32)

My invention relates to improvements in plug-nuts adapted to be applied to plates, castings and the like to provide secure fastenings therein for bolts and/or other members and elements.

In the manufacture and fabrication of various structures, particularly those comprising parts composed of relatively soft material, difficulties are often encountered in supplying in such structures secure fastenings for tie-bolts. Among these difficulties is the difficulty frequently met in threading a bolt-receiving hole in a plate or the like which the worker has been able to drill with comparative ease. A further difficulty resides in the relative weakness of bolt-fastening threads in a threaded hole formed in a relatively thin and/or soft plate, particularly in a case in which the bolt is desirably limited in diameter amply, but not excessively, to meet the strain to be placed thereon. A still further difficulty resides in the frequent necessity of providing bosses on relatively soft and/or thin castings to supply sufficient material in bolt-fastening threads to meet the contemplated strains upon the bolts.

An object of the present invention is to provide a simple, durable and inexpensive plug-nut, or bolt-fastening, which is adapted to be readily applied to the work and which efficiently overcomes the various difficulties frequently met in applying bolts to relative soft and/or thin plates or the like.

With the foregoing and other objects in view, which will appear in the following description, the invention resides in the novel combination and arrangement of parts and/or in the details of construction hereinafter described and claimed.

In the drawings, Fig. 1 is a view illustrating a form of plug-nut in embodiment of my invention, the same being shown partly in elevation and partly in section, said view further illustrating cross-sectionally a portion of a plate with a hole drilled therein to receive the plug-nut, and illustrating still further a tie-bolt threaded into said plug-nut; Fig. 2 is a view illustrating the plate, plug-nut and bolt portrayed in Fig. 1 and shows the plug-nut seated in the hole in the plate; Fig. 3 is an enlarged sectional view taken as on the line 3—3 of Fig. 2; Fig. 4 is a view similar to Fig. 1 showing an alternate form of plug-nut in embodiment of the present invention; Fig. 5 is a view similar to Fig. 2 showing said alternate form of plug-nut seated in the hole in the plate, and Fig. 6 is an enlarged sectional view taken as on the line 6—6 of Fig. 5.

Reference being had to the accompanying drawing wherein similar parts are designated by similar reference characters throughout the several views, it will be understood that 10 (Figs. 1, 2 and 3) designates a plate or portion of a casting of relatively soft material. In said plate 10 is a hole 11 formed as by a drill or otherwise, the transverse cross-sectional dimensions of said hole being uniform. Designed to be seated in the hole 11 and to provide a secure fastening for a bolt, as at 12, is a plug-nut 13. The body 14 of this plug-nut 13 is in the form of a frustum, the form shown being frusto-conical. At the smaller end of said body 14 is a reduced and relatively sharply tapered pilot portion 15. Said plug-nut is formed with a threaded axial bore 16 for the threaded reception of the bolt 12, and the body 14, externally thereof, is formed with plain knurling providing short, sharp teeth 17 extending longitudinally of said body 14. The root diameter of the toothed body 14, at its smaller end, is substantially the same as the diameter of the hole 11 in the plate 10 and the taper of said body 14, though relatively slight in all cases, will vary more or less depending upon the various conditions obtaining in respect to any particular plate and plug-nut.

When the plug-nut 13 is applied to the plate 10, the pilot portion 15 of the former guides the body 14 into the hole 11. As the lower edge of the body 14 enters the hole 11, the teeth 17 cut into the material of the plate 10 and keep the plug-nut from turning relative thereto. Proceeding with the seating of the plug-nut 13 in the hole 11, the material of the plate 10 is deformed entirely about the hole in accommodation of the plug-nut body 14. Upon the seating of the plug-nut body 14 in said hole 11, substantial and circumferentially continuous deformation of the plate material will be produced about the hole and an annularly complete gripping action effected thereby between the plate and plug-nut sufficiently strong alone to hold the plug-nut firmly and securely in the plate.

While the plug-nut 13 may be press-seated into the hole 11 in the plate 10 under circumstances admitting of such procedure, it will be readily comprehended that said plug-nut may be drawn into seated position (Fig. 2) by a bolt, such as the bolt 12, assuming, of course, that such bolt, though rotatable, is axially held.

It can be seen from the drawings that the plug-nut or insert is not substantially deformed upon seating while the material of the plate about the hole is deformed upon seating of the insert. In other words, the plug-nut or insert is stronger or is of greater resistance to compressive deformation than the material of the plate about the hole is to expansive deformation. This insures that upon enforced seating of the insert, small end foremost in the hole, substantial deformation of the plate material about the hole will be produced without substantial deformation of the frusto-conical portion of the insert. This action provides a gripping action between the insert portion sufficient alone to hold the insert securely relative to the plate.

From the foregoing, it will be appreciated that the plug-nut 13, seated within the hole 11 in the plate 10, provides a fastening for the bolt 12 and one that ordinarily will be more secure than a fastening consisting merely of threads fitting said bolt and cut in the material of the plate 10. Also, it will be appreciated that it might be difficult under some circumstances, if not impossible, even to thread a hole in plate 10 after the possible formation of such hole therein. And it wil be further appreciated that the simple fastening afforded by the plug-nut 13 readily may be of a strength equal to fastening threads formed in the plate proper and continuing into a boss formed on the plate to provide additional threads for strength. Still further, it will be appreciated that a hole drilled anywhere in a plate or the like at any stage in production of any given work, may be conveniently fitted with a plug-nut of the instant nature to provide a secure bolt-fastening.

Obviously, the plug-nut 13 may be inexpensively produced in large quantities as in automatic lathes or otherwise, whereby the cost of providing bolt-fastenings of the instant nature will be extremely low.

In Figs. 4, 5 and 6, which illustrates an alternate form of my invention, it will be seen that, similarly to the form shown in Figs. 1, 2 and 3, the plug-nut 20 seats in a cylindrical hole 21 in plate 22; that said plug-nut 20 has a pilot portion 23 and a frusto-conical body 24; and that said plug-nut 20 has a threaded axial bore 25 for the threaded reception of a bolt 26. Instead of being continuously toothed, as in the first described form of my invention, the body 24 of the plug-nut 20 in the alternate form, shown in Figs. 4–6, has flutes or grooves 27 formed therein longitudinally thereof at intervals spaced considerably apart circumferentially of the body, and the outside diameter, rather than the root diameter, of said body at its smaller end, is substantially the same as the diameter of the cylindrical hole 21 in the plate 22. In applying my invention to plates or the like of some materials, it is desirable to avoid the cutting of such materials by the plug-nut when seating the latter and this desideratum is had in said alternate form of my invention, which retains the important advantages of the first described form. In said second or alternate form of the invention, the material of the plate 22 is displaced upon the seating of the plug-nut 24, more or less of such material being accommodated and accumulating in the grooves or flutes 27 in the body 24. The formation of said grooves or flutes 27 in said body 24 provides abutments 28 in the plug-nut structure, which engage the material accumulating in the grooves thereof, and such engagement of said abutments 28 with such accumulated material prevents the turning of the plug-nut 20 with the bolt 26 as the former is seated upon tightening rotation of the latter. All of the outside plate-contacting surfaces 29 of the plug-nut 20, between the widely spaced grooves or flutes 27, are smooth and of relatively great area with the result that the material of the plate 22 suffers no cutting or scratching as the plug-nut 20 is seated.

Changes in the specific form of my invention, as herein disclosed, may be made within the scope of what is claimed without departing from the spirit of my invention.

Having described my invention, what I claim as new and desire to protect my Letters Patent is:

1. In combination, a plate having a cylindrical hole therein, an insert having a continuous frusto-conical outer surface portion having its small end free and of a diameter substantially equal to but of less diameter than the diameter of the hole, a threaded bore in the insert for about the length of the frusto-conical portion and said insert being of greater resistance to deformation than the resistance of the material of the said plate to deformation, the taper of the frusto-conical portion from the smaller end being such that upon enforced seating, small end foremost in said hole, substantial and circumferential deformation of the plate material will be produced about the hole without substantial deformation of the frusto-conical portion.

2. In combination, a plate having a cylindrical hole therein, an insert having a continuous frusto-conical outer surface portion having its diameter adjacent the small end substantially equal to the diameter of the hole, the insert threaded for receiving a mating member, the insert having stronger resistance to deformation than the plate to deformation, the frusto-conical portion from the smaller end being such that upon enforced seating, small end foremost in said hole, substantial deformation of the plate material about the hole will be produced without substantial deformation of the frusto-conical portion.

3. In combination, a plate having a hole of substantially uniform transverse cross-sectional dimensions therein, an insert having a continuous frusto-conical outer surface portion and of a diameter in a plane adjacent the small end thereof substantially equal to the diameter of the hole, the insert machined for receiving a mating member, the insert of greater resistance to compressive deformation than the plate to expansive deformation, the taper of the frusto-conical portion from the smaller end being such that upon enforced seating, small end foremost in said hole, substantial deformation of the plate material about the hole will be produced without substantial deformation of the frusto-conical portion.

4. In combination, a plate having a hole of substantially uniform transverse cross-sectional dimensions therein, an insert having a continuous frusto-conical outer surface portion having its small end of a diameter substantially equal to but less than the diameter of the hole, the insert machined for receiving a mating member, the insert of greater resistance to compressive deformation than the material of the plate to expansive deformation, the taper of the frusto-conical portion from the smaller end being such that upon enforced seating, small end foremost in said hole, substantial deformation of the plate material about the hole will be produced without substantial deformation of the frusto-conical portion, said frusto-conical portion of the insert having serrations therein and distributed about the same.

CHARLES L. MADDEN.

REFERENCES CITED

The following references are of record in the file of this patent:

UNITED STATES PATENTS

| Number | Name | Date |
|---|---|---|
| 823,292 | Robinson | June 12, 1906 |
| 1,373,645 | Bandoly | Apr. 5, 1921 |
| 1,450,460 | Smith | Apr. 3, 1923 |
| 1,587,102 | Wrighton | June 1, 1926 |
| 1,681,048 | Purcell | Aug. 14, 1928 |
| 1,891,895 | Nagel | Dec. 20, 1932 |
| 1,966,835 | Stites | July 17, 1934 |
| 2,006,525 | Thal | July 2, 1935 |
| 2,204,385 | Schmidt | June 11, 1940 |
| 2,223,871 | Johnson | Dec. 3, 1940 |
| 2,254,502 | Thomas | Sept. 2, 1941 |
| 2,307,080 | Schaefer | Jan. 5, 1943 |
| 2,434,832 | Bruun | Jan. 20, 1948 |

FOREIGN PATENTS

| Number | Country | Date |
|---|---|---|
| 133,093 | Great Britain | Oct. 9, 1919 |